Nov. 29, 1966  J. L. MARSHALL, JR., ETAL  3,287,977
THREADLINE TEMPERATURE MONITOR
Filed May 27, 1964
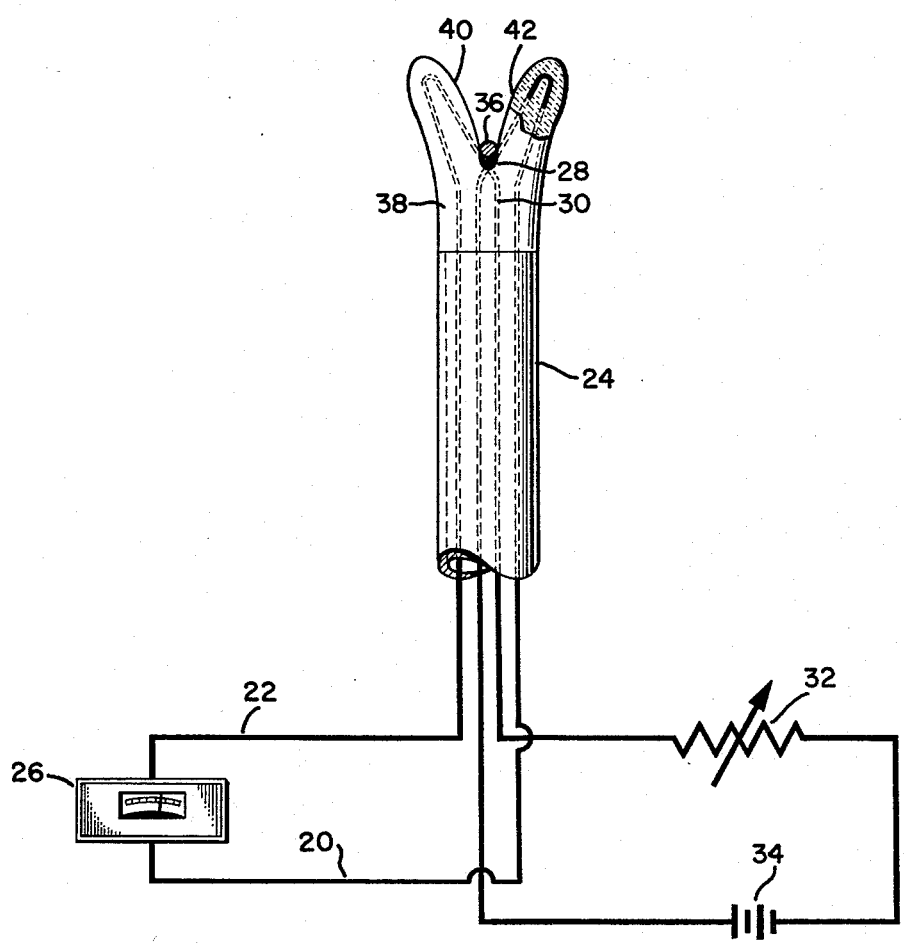
INVENTORS
JOHN L. MARSHALL, JR
GEORGE B. PRICE
BY
*Kelly O. Corley*
ATTORNEY

United States Patent Office 3,287,977
Patented Nov. 29, 1966

3,287,977
THREADLINE TEMPERATURE MONITOR
John L. Marshall, Jr., and George B. Price, Pensacola, Fla., assignors to Monsanto Company, St. Louis, Mo., a corporation of Delaware
Filed May 27, 1964, Ser. No. 370,544
8 Claims. (Cl. 73—359)

This invention relates to a temperature monitoring device, and more particularly to such a device for measuring the temperature of a running threadline.

In various manufacturing and control operations it is necessary to accurately determine the temperature of a filamentary member such as a running threadline. An example of such an environment would be in the manufacture of artificial yarn, such as nylon. It has been extremely difficult to measure accurately the temperature of a moving threadline using conventional prior art techniques. A major problem encountered in such measurements is the common presence of stray air currents and the like. For that reason, most prior measurements of yarn temperatures have involved a large amount of guesswork and approximation.

A primary object of the invention is to provide an instrument for continuously and accurately indicating the temperature of a moving threadline.

A further object of the invention is to provide an instrument of the above character which uses a thermocouple junction heated approximately to the temperature to be measured, and wherein means are provided to shield said thermocouple from stray air currents.

Other objects and advantages will become apparent from the following detailed description taken in connection with the accompanying drawing, in which the single figure is a schematic diagram of an exemplary embodiment of the invention.

Referring now to the drawing, leads 20 and 22 extend through a tubular member 24 from meter 26 to a thermocouple junction 28, which may be formed by spot-welding the ends of leads 20 and 22 together in a well known manner. Meter 26 is calibrated to indicate the temperature of junction 28.

An intermediate point on a resistance wire 30 is mounted in thermal contact with junction 28, as by welding. The free ends of resistance wire 30 are extended through tubular member 24 and connected in series with variable resistor 32 and a source of heating current 34 (illustrated as a battery), so as to provide a controllable flow of heating current in resistance wire 30. The several wires or leads in tubular member 24 are insulated from one another so that the only contact is at junction 28.

In operation of the device, resistor 32 is adjusted so that the current flowing in the resistance wire 30 heats the thermocouple junction 28 to the temperature to which the threadline 36 is to be heated. When variable resistor 32 is properly adjusted, the meter 26 will indicate the desired temperature. Junction 28 is then brought into contact with threadline 36. If the yarn temperature is above the desired operating value, the temperature of junction 28 will increase, causing the meter to indicate a higher temperature corresponding to the actual temperature of the yarn. If the yarn temperature is below the desired operating value the yarn will be cooler than junction 28 and heat will flow from the junction to the yarn. This will cause meter 26 to indicate a lower temperature corresponding to the actual yarn temperature. Thus, there is no heat transfer from the yarn to the thermocouple junction 28 or vice versa when the yarn is at the desired temperature. If, however, the yarn temperature varies there will be a small heat transfer to or from junction 28, which can be measured accurately by meter 26.

According to the present invention, the portions of leads 20 and 22 and of resistance wire 30 which extend beyond the end of tubular member 24 are arranged within a shield 38 which protects them from the effects of stray air currents. Preferably shield 38 comprises an encapsulating mass surrounding the thermocouple leads and the resistance wire to form an integral assembly with tubular member 24 serving as a handle. As illustrated, shield 38 has inner convergent surfaces 40 and 42 defining a generally V-shaped threadline guide wherein the apex of the V coincides with junction 28, so that only junction 28 is exposed. Since in operation junction 28 is in contact with threadline 36, stray air currents are effectively excluded from affecting the junction temperature. Shield 38 preferably is made of a porcelain cement or other refractory insulating material, bonded to tubular member 24 and to leads 20 and 22 and wire 30.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. Apparatus for measuring the temperature of a running threadline, comprising in combination:
   (a) means forming a shield having convergent surfaces defining a generally V-shaped threadline guide;
   (b) a pair of leads mounted within said shield and joined to form a thermocouple junction which is exposed at the apex of said V; and
   (c) a resistance wire mounted within said shield and in thermal contact with said junction.

2. The apparatus defined in claim 1, further comprising:
   (a) means connected to said resistance wire for passing an electrical current therethrough for heating said thermocouple junction; and
   (b) means for indicating the temperature of said junction.

3. The apparatus defined in claim 1, wherein said shield comprises a body of material encapsulating said resistance wire and said leads.

4. The apparatus defined in claim 1, wherein said shield comprises a refractory body.

5. Apparatus for measuring the temperature of a running threadline, comprising in combination:
   (a) a thermocouple having a pair of leads connected to form a thermocouple junction;
   (b) a resistance wire in thermal contact with said junction; and
   (c) a shield generally enclosing and shielding said shield having convergent surfaces defining a generally V-shaped threadline guide with said thermocouple junction exposed at the apex of said V.

6. The apparatus defined in claim 5, further comprising:
   (a) means connected to said resistance wire for passing an electrica lcurrent therethrough for heating said thermocouple junction; and
   (b) means for indicating the temperature of said junction.

7. The apparatus defined in claim 5, wherein said shield comprises a body of material encapsulating said resistance wire and said leads.

8. The apparatus defined in claim 5, wherein said shield comprises a refractory body.

References Cited by the Examiner
UNITED STATES PATENTS

| | | | |
|---|---|---|---|
| 2,579,994 | 12/1951 | Zinn | 73—359 X |
| 2,839,594 | 6/1958 | Schneidersmann | 73—359 X |
| 2,870,233 | 1/1959 | Comer. | |
| 3,204,462 | 9/1965 | Horne | 73—359 |

LOUIS R. PRINCE, *Primary Examiner.*

DONN McGIEHAN, *Assistant Examiner.*